United States Patent [19]
Oh

[11] Patent Number: 5,946,443
[45] Date of Patent: Aug. 31, 1999

[54] METHOD AND APPARATUS FOR RESTORING SYNC DATA IN A DIGITAL VIDEO DISC PLAYBACK SYSTEM

[75] Inventor: Cheol-Gyoon Oh, Gunpo, Rep. of Korea

[73] Assignee: Samsung Electronics Co., Ltd., Rep. of Korea

[21] Appl. No.: 08/891,138

[22] Filed: Jul. 10, 1997

[30] Foreign Application Priority Data

Aug. 9, 1996 [KR] Rep. of Korea ....................... 96-33234

[51] Int. Cl.⁶ .................................................. H04N 5/781
[52] U.S. Cl. .............................................. 386/46; 386/84
[58] Field of Search ............................... 386/46, 84, 12, 386/48, 47, 85, 125, 126, 95, 90; 369/32, 48, 49

[56] References Cited

U.S. PATENT DOCUMENTS 4,791,622 12/1988 Clay et al. ................................ 386/84
5,446,715 8/1995 Satomura ................................ 386/124
5,696,867 12/1997 Lee ........................................... 386/84
5,712,741 1/1998 Lee ........................................... 386/84

*Primary Examiner*—Huy Nguyen
*Attorney, Agent, or Firm*—Sughrue, Mion, Zinn, Macpeak & Seas, PLLC

[57] ABSTRACT

A sync data restoring method and apparatus restores data recorded on a digital video disc (DVD) despite damaged sync data in a digital video disc playback system. The method and apparatus determines whether sync data is normal or not using a window signal and substitutes quasi sync data for abnormal sync data when sync data is abnormal in the DVD playback system, to enable accurate reproduction of data despite damaged sync data in a DVD playback system.

23 Claims, 5 Drawing Sheets

```
                State 1                                     State 2
    (MSB)                  (LSB)              (MSB)                  (LSB)
SY0 = 0001001001000000000000010001        SY0 = 0001001000001000000000010001
SY1 = 0000100100100000000000010001        SY1 = 0000100100010000000000010001
SY2 = 0001001000000000000000010001        SY2 = 0001001000100000000000010001
SY3 = 0000100100000000000000010001        SY3 = 0000100010001000000000010001
SY4 = 0010001001000000000000010001        SY4 = 0010010001000000000000010001
SY5 = 0010001001001000000000010001        SY5 = 0010010001001000000000010001
SY6 = 0010010010001000000000010001        SY6 = 0010000010001000000000010001
SY7 = 0010010010001000000000010001        SY7 = 0010010000001000000000010001

State 3                                     State 4
    (MSB)                  (LSB)              (MSB)                  (LSB)
SY0 = 1001001000100000000000010001        SY0 = 1001001001000000000000010001
SY1 = 1000100100100000000000010001        SY1 = 1000100100100000000000010001
SY2 = 1001001000100000000000010001        SY2 = 1001000001000000000000010001
SY3 = 1000100100100000000000010001        SY3 = 1000100010001000000000010001
SY4 = 1000100001001000000000010001        SY4 = 1000100001001000000000010001
SY5 = 1001001001000000000000010001        SY5 = 1000100001000000000000010001
SY6 = 1001001000100000000000010001        SY6 = 1000000010001000000000010001
SY7 = 1000100100100000000000010001        SY7 = 1000000010001000000000010001
```

FIG. 3

METHOD AND APPARATUS FOR RESTORING SYNC DATA IN A DIGITAL VIDEO DISC PLAYBACK SYSTEM

BACKGROUND OF THE INVENTION

1. Field of the Invention

The present invention relates to a digital video disc playback system, and more particularly, to a sync data restoring apparatus and method which are capable of accurately restoring data recorded on a digital video disc (DVD) despite damaged sync data in a digital video disc playback system.

2. Description of the Related Art

The basic technology of the optical disc for reading data in a non-contact manner using a laser light has been greatly developed since its establishment about 20 years ago. As a result, current compact discs (hereinbelow, referred to as CD) having a one side disc structure of a diameter of 120 mm and a thickness of 1.2 mm are widely used. It is possible to record data of approximately 640 Mbytes on one side of such a CD. However, in the technical field of optical discs, as the rotating speed, overwriting and density (increased storage capacity) have increased due to the development of a short-wavelength laser or recording playback technology, a storage medium, for example, a Digital Video Disc (hereinbelow, referred to as DVD) has recently been introduced. The DVD and the CD share the one side disc structure having a diameter of 120 mm and a thickness of 1.2 mm. However, the DVD can record much more data (about 6 times; data of 4.7 GByte) compared to the CD. Accordingly, the DVD is a recording medium suitable for an optical system for the next generation in which an increase in the amount of information will be required.

DVD related technologies have required a record and reproduction of high density. If a small glitch is generated or an error of sync data during reproduction, it may be impossible to accurately reproduce the data. Further, technology which enables accurate reproduction of data recorded on a disc despite damaged sync data is required.

SUMMARY OF THE INVENTION

It is, therefore, an object of the present invention to provide an apparatus and method for restoring sync data damaged in a DVD playback system.

It is a further object of the present invention to provide a sync data restoring apparatus for enabling normal reproduction of data despite damaged sync data in a DVD playback system.

It is still another object of the present invention to provide an apparatus and method for preventing a synchronization of data due to the damage of sync data in a DVD playback system.

According to a first aspect of the present invention, there is provided a sync data restoring apparatus in a DVD playback system, comprising: a sync detecting means for detecting a frame synchronizing code and an ID synchronizing code from predetermined EFM plus data and for outputting a detected frame synchronizing signal and a detected ID synchronizing signal at the time when the codes are detected; a quasi frame sync generating means for generating a quasi frame synchronizing signal in a preset time unit based on the detected frame synchronizing signal; a frame sync restoring means for determining the degree of approximation of the detected frame synchronizing signal to the quasi frame synchronizing signal, selecting any one frame synchronizing signal of the detected frame synchronizing signal and the quasi frame synchronizing signal according to the determined results and outputting the selected one as a restored frame synchronizing signal; a quasi ID sync generating means for generating a quasi ID synchronizing signal in a preset time unit on a basis of a frame synchronizing signal at a preset time of a series of the restored frame synchronizing signals; an ID sync restoring means for determining the degree of approximation of the detected ID synchronizing signal to the quasi ID synchronizing signal, selecting any one ID synchronizing signal of the detected ID synchronizing signal and the quasi ID synchronizing signal according to the determined results and outputting the selected one as a restored ID synchronizing signal.

According to a second aspect of the present invention, there is also provided a sync data restoring apparatus in a DVD playback system, comprising: a sync detecting means for detecting synchronizing codes (a frame sync and an ID sync) from predetermined EFM plus data and for outputting synchronizing signals at the time when the codes are detected; a quasi frame sync generating means for generating a quasi frame synchronizing signal in a preset time unit in accordance with the detected frame synchronizing signal; a frame sync window generating means for generating a frame synchronizing window signal having a predetermined width; a frame sync discriminating means for determining whether or not the detected frame synchronizing signal and the quasi frame synchronizing signal fall within the predetermined range or width of the frame synchronizing window signal and for outputting one of the detected and quasi frame synchronizing signals according to the determined results; a frame sync output means for outputting the detected frame synchronizing signal as a restored frame synchronizing signal when the detected frame synchronizing signal and the quasi frame synchronizing signal fall within the predetermined range of the frame synchronizing window signal and for outputting the quasi frame synchronizing signal as the restored frame synchronizing signal when the detected frame synchronizing signal and the quasi frame synchronizing signal do not exist within a predetermined range of the frame synchronizing window signal; a quasi ID sync generating means for generating an ID synchronizing signal at a preset time in response to one of the restored frame synchronizing signals; an ID sync window generating means for generating an ID synchronizing window signal having a preset width in accordance with the quasi ID synchronizing signal; an ID sync discriminating means for determining whether or not the detected ID synchronizing signal and the quasi ID synchronizing signal fall within a predetermined range of the ID synchronizing window signal and for outputting one of the detected and quasi ID synchronizing signals according to the determined results; an ID sync output means for outputting the detected ID synchronizing signal as a restored ID synchronizing signal when the detected ID synchronizing signal and the quasi ID synchronizing signal fall within a predetermined range of the ID synchronizing window signal, and for outputting the quasi ID synchronizing signal as the restored ID synchronizing signal when the detected ID synchronizing signal and the quasi ID synchronizing signal do not fall within the predetermined range of the ID synchronizing window signal.

According to a third aspect of the present invention, there is provided a sync data restoring method in a DVD playback system, comprising the steps of: detecting a frame synchronizing code and an ID synchronizing code from predetermined EFM plus data and outputting a detected frame synchronizing signal and a detected ID synchronizing signal at the time when the codes are detected; generating a quasi frame synchronizing signal in a preset time unit in response to the detected frame synchronizing signal; restoring a frame sync by determining the degree of approximation of the detected frame synchronizing signal to the quasi frame synchronizing signal, selecting one of the detected frame synchronizing signal and the quasi frame synchronizing signal according to the determined results and outputting the selected one as the restored frame synchronizing signal; generating a quasi ID synchronizing signal in a preset time unit on the basis of a frame synchronizing signal; restoring an ID sync by determining the degree of approximation of the detected ID synchronizing signal to the quasi ID synchronizing signal, selecting one of the detected ID synchronizing signal and the quasi ID synchronizing signal according to the determined results and outputting the selected one as the restored ID synchronizing signal.

The quasi frame sync generating means generates the first quasi frame synchronizing signal based on the detected frame synchronizing signal and then generates a quasi frame synchronizing signal every 1488 T (here, TTS channel clock). The quasi ID sync generating means generates the first quasi ID synchronizing signal on the basis of the 26th restored frame synchronizing signal, from a series of the restored frame synchronizing signals, and then generates a quasi ID synchronizing signal every time 26 is counted by counting the time required for the output of the second restored frame synchronizing signal after the output of the first restored frame synchronizing signal. The quasi frame sync generating means and the quasi ID sync generating means can be embodied by counters counting 1488 and 26, respectively.

Meanwhile, the frame sync output means resets the quasi frame sync generating means so that the quasi frame sync generating means resumes operation based on the detected frame synchronizing signal if the number of the detected frame synchronizing signal existing without a predetermined range of the frame window is more than the number preset by a microcomputer, and the ID sync output means resets the quasi ID sync generating means so that the quasi ID sync generating means resumes operation on the basis of the restored frame synchronizing signal if the detected ID synchronizing signal exists without a predetermined range of the ID window to thereby go off the location preset by the microcomputer.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements wherein:

FIG. 3 is a detailed view of the structure of the sync data as shown in FIG. 2;

DETAILED DESCRIPTION OF THE PREFERRED EMBODIMENTS

Figure 1:
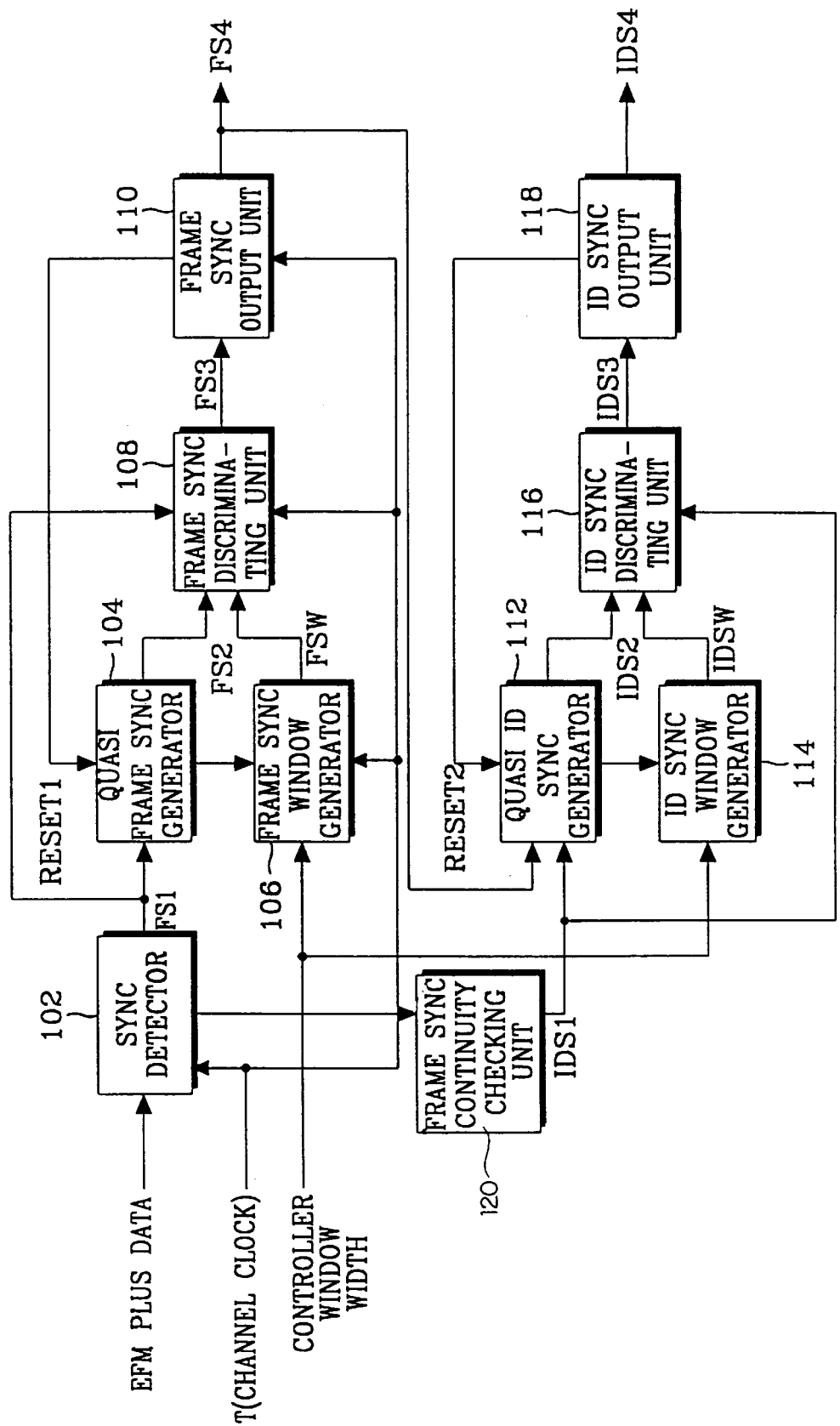
FIG. 1 is a block diagram showing the construction of a sync data restoring apparatus in a digital video disc playback system according to an embodiment of the present invention.

The present invention will be described in detail with reference to the accompanying drawings. Throughout the drawings, it is noted that the same reference numerals or letters will be used to designate like or equivalent elements having the same function. In the following description, numeral specific details such as components composing a concrete circuit, expressions are set forth to provide a more thorough understanding of the present invention. However, it will be apparent to one skilled in the art that the invention may be practiced without their specific details. The detailed descriptions on known function and constructions unnecessarily obscuring the subject matter of the present invention will be avoided hereinafter.

Referring to FIG. 1, there is shown a block diagram showing the inner construction of a sync data restoring apparatus in a digital video disc playback system according to an embodiment of the present invention. The sync data restoring apparatus according to the present invention includes a sync detector 102 for detecting a frame synchronizing code and an ID synchronizing code from predetermined EFM (Eight-to-Fourteen Modulation) Plus data, a quasi frame sync generator 104 for executing the operation of restoring a frame synchronizing signal, i.e. the operation of determining whether or not the detected frame synchronizing signal is a normal frame synchronizing signal and restoring the normal or accurate frame synchronizing signal from the determined results, a frame sync window generator 106, a frame sync discriminating unit 108, a frame sync output unit 110, a quasi ID sync generator 112 for executing the operation of restoring an ID synchronizing signal, i.e. the operation of determining whether or not the detected ID synchronizing signal is a normal or accurate ID synchronizing signal and restoring the normal ID synchronizing signal from the determined results, an ID sync window generator 114, an ID sync discriminating unit 116 and an ID sync output unit 118.

In FIG. 1, a reference symbol, and EFM plus data are the data recorded on a DVD after modulation by typical modulation techniques of a DVD playback apparatus. A reference symbol, FS and IDS are sync data recorded with information data on a DVD. In FIG. 1, FS designates Frame Synchronization and IDS designates ID Synchronization. The intention of employing the term "quasi" like in the example of an quasi frame sync and a quasi ID sync is to indicate the analogous generation of the frame sync and the ID sync different from the sync data recorded on a DVD.

The sync detector 102 detects a frame synchronizing code and an ID synchronizing code from predetermined EFM plus data applied thereto and outputs a detected frame synchronizing signal FS1 and a detected ID synchronizing signal IDS1 at the time when the codes are detected. The EFM plus data applied to the sync detector 102 generally has a structure as shown in FIG. 2.

Figure 2:
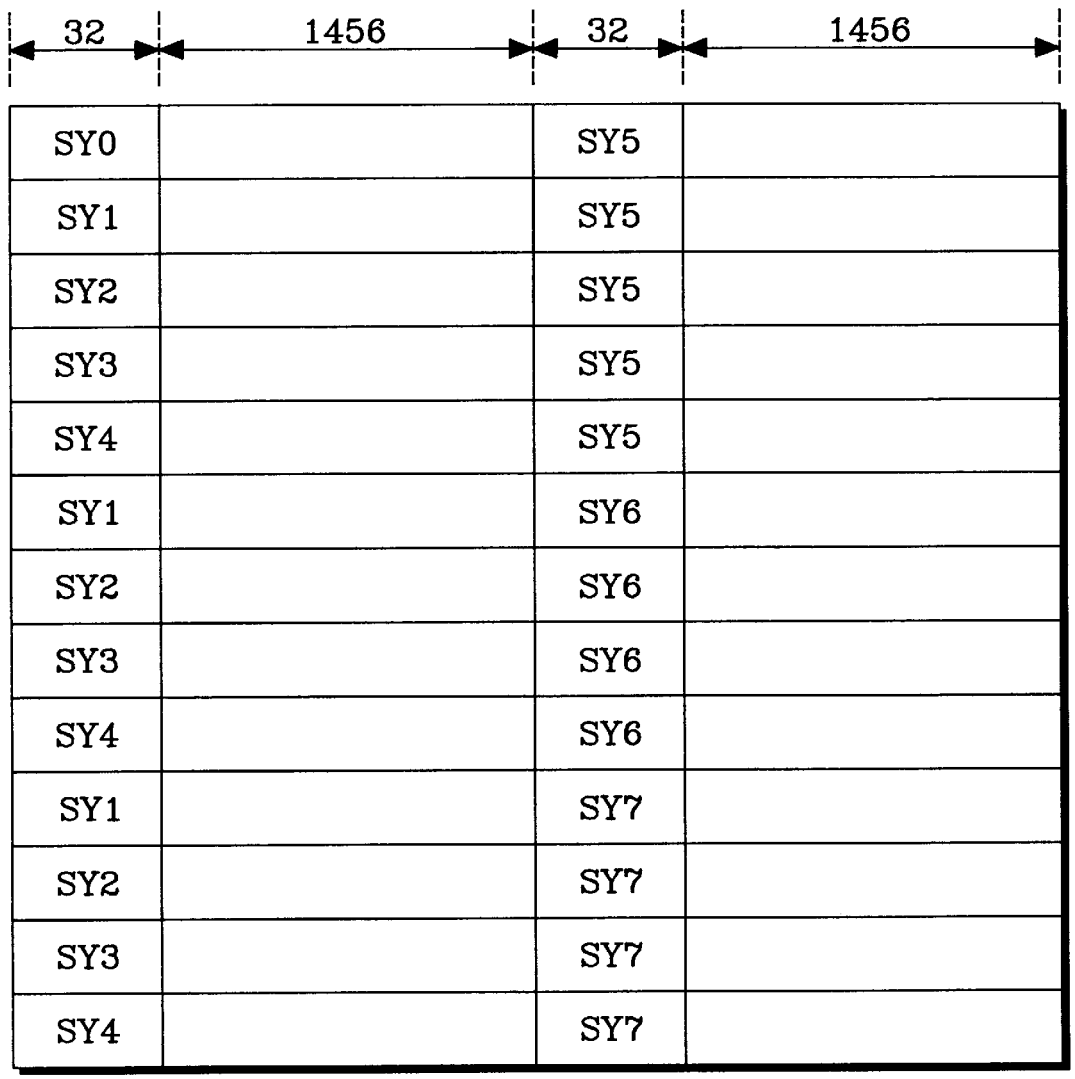
FIG. 2 is a view showing the order of sync data (frame sync) in a typical digital video disc DVD spec.

Referring to FIG. 2, the EFM plus data comprises 26 sync data (SY0-SY7) and information data, in which the sync data each consists of 32 bits and the information data each consists of 1456 bits. The 26 sync data are arranged in an order of SY0→SY5→SY1→SY5→SY2→SY5→SY3→ . . . . SY2→SY7→SY3→SY7→SY4→SY7, a first sync data SY0 of the 26 sync data is designated as an ID synchronizing code and the other 25 sync data are designated as frame synchronizing code.

Referring to FIG. 3, a detailed view of the structure of the sync data of FIG. 2 is illustrated.

Each of the sync data can consist of any one of 4 state (state 1–state 4) values. That is, in FIG. 1, the sync detector 102 detects a frame synchronizing code and an ID synchronizing code from EFM plus data having the structure as shown in FIG. 2 and FIG. 3, and outputs a detected frame synchronizing signal FS1 and a detected ID synchronizing signal IDS1.

In FIG. 1, the quasi frame sync generator 104 generates a quasi frame synchronizing signal FS2 in a preset time unit in accordance with the detected frame synchronizing signal FS1 output from the sync detector 102. More specifically, the quasi frame sync generator 104 generates the first quasi frame synchronizing signal on the basis of the detected frame synchronizing signal FS1 and then generates a quasi frame synchronizing signal every 1488 T (channel clock) interval. The purpose of generating a quasi frame synchronizing signal is to enable the normal reproduction of information data if the detected frame synchronizing signal detected by the sync detector 102 is abnormal. The quasi frame sync generator 104 can be embodied by a counter for counting 1488 clocks. The frame sync window generator 106 generates a frame synchronizing window signal FSW, having a preset width at the front and the rear thereof, on the basis of the quasi frame synchronizing signal FS2 generated by the quasi frame sync generator 104. The width of the frame synchronizing window signal FSW is set by a control unit (a microcomputer) (not shown) of a DVD playback system.

The frame sync discriminating unit 108 determines the degree of approximation of the detected frame synchronizing signal FS1 generated by the sync detector 102 to the quasi frame synchronizing signal FS2 generated by the quasi frame sync generator 104, selects one frame synchronizing signal from the detected frame synchronizing signal FS1 and the quasi frame synchronizing signal FS2 according to the determined results and outputs the selected one. In the present embodiment, the standard for determining which signal to select is the frame synchronizing window signal FSW generated by the frame sync window generator 106. The frame sync discriminating unit 108 selects and outputs the detected frame synchronizing signal FS1 if the detected frame synchronizing signal FS1 and the quasi frame synchronizing signal FS2 fall within a predetermined range of the frame synchronizing window signal FSW, and selects and outputs the quasi frame synchronizing signal FS2 if the detected frame synchronizing signal FS1 does not fall within the predetermined range of the frame synchronizing window signal FSW. The frame synchronizing signal FS3 selected and output by the frame sync discriminating unit 108 is input to a frame sync output unit 110 which in turn outputs the input frame synchronizing signal FS3 as a restored frame synchronizing signal FS4.

Figure 4:
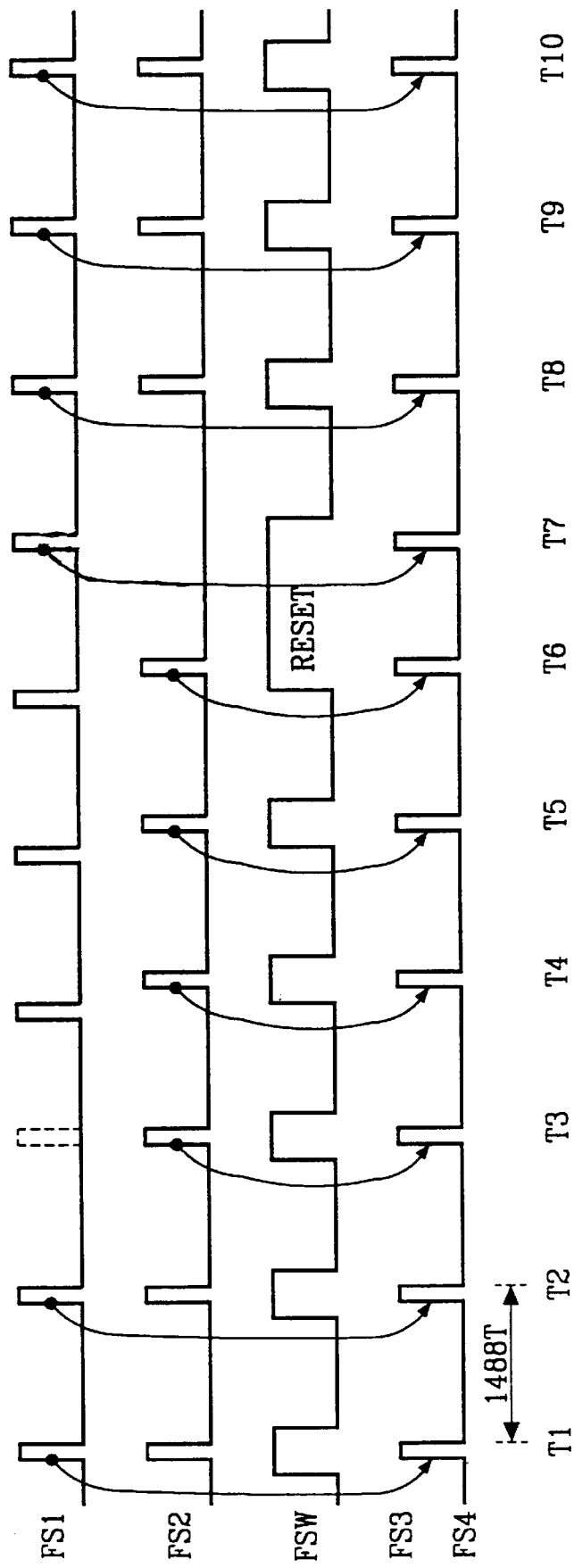
FIG. 4 is a timing diagram showing the timing in the operation of frame synchronizing signals restored by the sync data restoring apparatus as shown in FIG. 1 according to an embodiment of the present invention.

Referring, to FIG. 4, there is shown a timing diagram for the frame synchronizing signals restored by the quasi frame sync generator 104, the frame sync window generator 106, the frame sync discriminating unit 108 and the frame sync output unit 110 in the sync data restoring apparatus as shown in FIG. 1. In FIG. 4, the quasi frame sync generator 104 generates the first quasi frame synchronizing signal FS2 based on the detected frame synchronizing signal FS1 at time T1 and then generates a quasi frame synchronizing signal FS2 every time 1488 is counted by counting 1488 T (channel clock). The frame sync window generator 106 generates a frame synchronizing window signal FSW having a preset width at the front and the rear thereof based on the quasi frame synchronizing signal FS2. The width of the frame synchronizing window signal FSW can be preset in 6 T, 10 T 12 T or 24 T by a control (not shown) as described above. The frame sync discriminating unit 108 selects and outputs the detected frame synchronizing signal FS1 if the detected frame synchronizing signal FS1 and the quasi frame synchronizing signal FS2 exist within a predetermined range of the frame synchronizing window signal FSW, and selects and outputs the quasi frame synchronizing signal FS2 if the detected frame synchronizing signal FS1 and the quasi frame synchronizing FS2 do not fall within the predetermined range of the frame synchronizing window signal FSW (or if the detected frame synchronizing signal FS1 signal does not fall within the predetermined range of the frame synchronizing window signal FSW). In the present example, the frame sync discriminating unit 108 selects and Outputs the detected frame synchronizing signal FS1 since the detected frame synchronizing signal FS1 and the quasi frame synchronizing signal FS2 fall within the predetermined range of the frame synchronizing window signal FSW at times T1, T2, T8, T9 and T10, and selects and outputs the quasi frame synchronizing signal FS2 at times T3, T4 and T5, since only the quasi frame synchronizing FS2 signal falls within the predetermined range of the frame synchronizing window signal FSW at these times.

As described above, the quasi frame sync generator 104, the frame sync window generator 106, the frame sync discriminating unit 108 and the frame sync output unit 110 execute the operation of determining whether the detected frame synchronizing signal FS1 is normal or not using the frame synchronizing window signal FSW, and for restoring the quasi frame synchronizing signal FS2, which can be substituted for the abnormal detected frame synchronizing signal FS1, since it is impossible to accurately reproduce information from the detected frame synchronizing signal FS1 when it is determined that the detected frame synchronizing signal FS1 is abnormal.

Meanwhile, there is a possibility that the quasi frame synchronizing signal FS2 will be output continuously as a restored frame synchronizing signal FS4, that is the detected frame synchronizing signal continuously exists without a predetermined range of the window, even when it is determined that the detected frame synchronizing signal FS1 is normal, and in order to prevent the continuous output of the quasi frame synchronizing signal FS2, the frame sync output unit 110 resets the frame window to thereby output the detected frame synchronizing signal as a restored frame synchronizing signal if the number of the detected frame synchronizing signal continuously existing without a predetermined range of the frame window is more than the number preset by the microcomputer. That is, the frame sync output unit 110 generates a reset signal RESET1 to reset the quasi frame sync generator 104. The reset quasi frame sync generator 104 generates the first quasi frame synchronizing signal FS2 on the basis of the detected frame synchronizing signal FS1 and then generates a quasi frame synchronizing signal FS2 every 1488 T(channel clock).

In FIG. 1, a quasi ID sync generator 112 generates a frame synchronizing signal at a preset time of a series of the restored frame synchronizing signals FS4 as a quasi ID synchronizing signal IDS2 after synchronization of the frame synchronizing signal using the ID synchronizing signal IDS1, in which the frame synchronizing signal at a preset time means the first sync data of the 26 sync data, i.e. ID synchronizing signal. That is, quasi ID sync generator 112 generates the first quasi ID synchronizing signal on the basis of the 26th restored frame synchronizing signal (ID synchronizing signal) of a series of the restored frame synchronizing signals FS4, and then generates a quasi ID synchronizing signal every time 26 is counted (the time when the next ID synchronizing signal is generated after the generation of ID synchronizing signal in case of normal state) by counting the time required for the output of the second restored frame synchronizing signal after the output of the first restored frame synchronizing signal. The quasi ID sync generator 112 can be embodied by a counter for counting 26. ID sync window generator 114 generates an ID synchronizing window signal IDSW having a preset width at the front and rear thereof based on the quasi ID synchronizing signal IDS2 generated by the quasi ID sync generator 112. The width of the ID synchronizing window signal IDSW can be set by a control (not shown) in a DVD playback system.

The ID sync discriminating unit 116 determines the degree of approximation of the detected ID synchronizing signal IDS1 generated by the sync detector 102 to the quasi ID synchronizing signal IDS2 generated by the quasi ID sync generator 112, and selects either the detected ID synchronizing signal IDS1 or the quasi ID synchronizing signal IDS2 according to the determined results and outputs the selected one. The standard for determining the degree of approximation is the ID synchronizing window signal IDSW generated by the ID sync window generator 114. The ID sync discriminating unit 116 selects and outputs the detected ID synchronizing signal IDS1 if the detected ID synchronizing signal IDS1 and the quasi ID synchronizing signal IDS2 fall within the predetermined range of the ID synchronizing window signal IDSW, and selects and outputs the quasi ID synchronizing signal IDS2 if the detected ID synchronizing signal IDS1 does not fall within the predetermined range of the ID synchronizing window signal IDSW. The ID synchronizing signal IDS3 selected and output by the ID sync discriminating unit 116 is input to an ID sync output unit 118, which in turn outputs the ID synchronizing signal IDS3 as a restored ID synchronizing signal IDS4.

Figure 5:
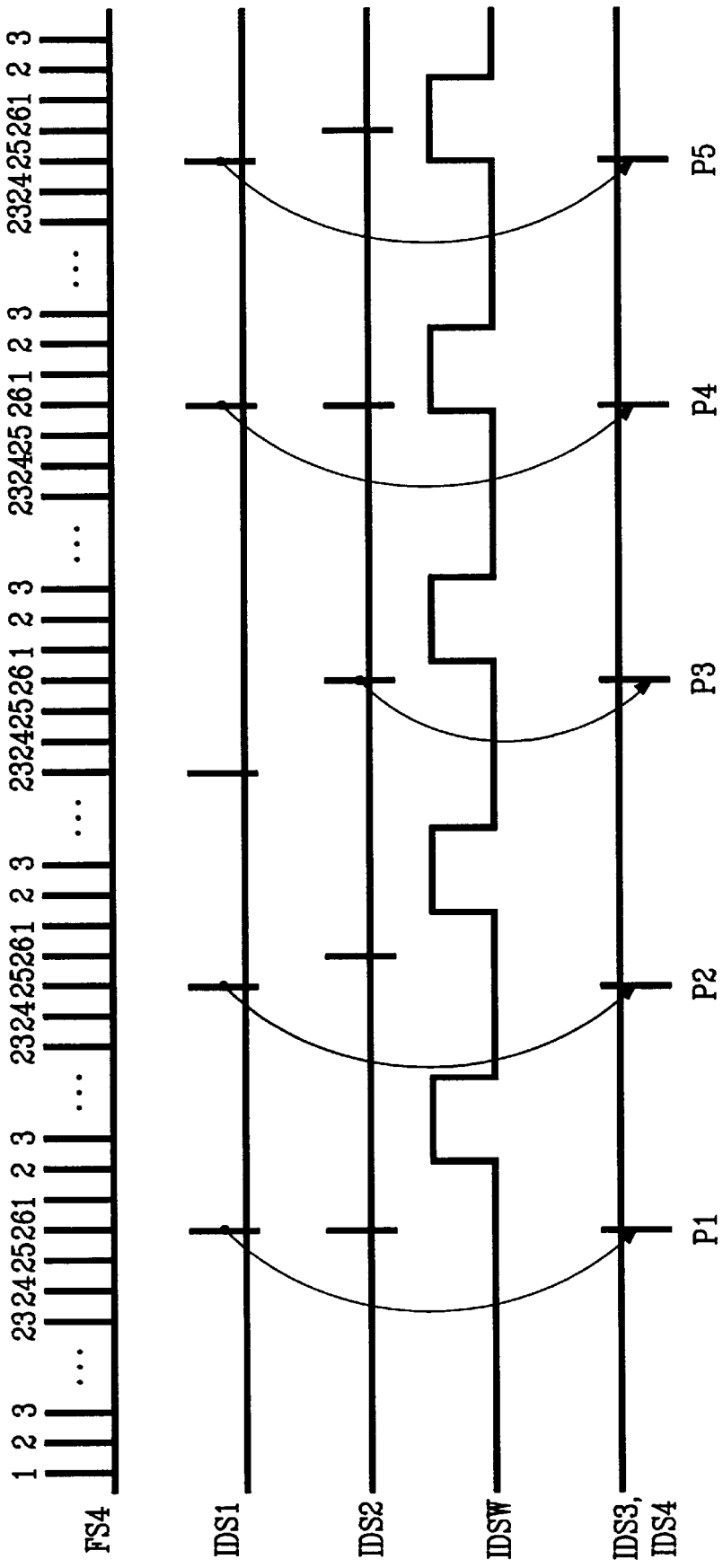
FIG. 5 is a timing diagram showing the timing in the operation of ID synchronizing signals restored by the sync data restoring apparatus as shown in FIG. 1 according to an embodiment of the present invention.

Referring to FIG. 5, there is shown a timing diagram showing the timing in the operation of ID synchronizing signals restored by the quasi ID sync generator 112, the ID sync window generator 114, the ID sync discriminating unit 116 and the ID sync output unit 118 in the sync data restoring apparatus as shown in FIG. 1. In FIG. 5, the quasi ID sync generator 112 generates the first quasi ID synchronizing signal IDS2 in accordance with the restored frame synchronizing signal FS4 at time P1 and then generates a quasi ID synchronizing signal IDS2 every time 26 is counted. The ID sync window generator 114 generates an ID synchronizing window signal IDSW having a preset width at the front and the rear thereof in accordance with the quasi ID synchronizing signal IDS2. The width of the ID synchronizing window signal IDSW can be preset by a control (not shown) as described above. The ID sync discriminating unit 116 selects and outputs the detected ID synchronizing signal IDS1 if the detected ID synchronizing signal IDS1 and the quasi ID synchronizing signal IDS2 fall within the predetermined range of the ID synchronizing window signal IDSW and selects and outputs the quasi ID synchronizing signal IDS2 if the detected ID synchronizing signal IDS1 and the quasi ID synchronizing IDS2 do not fall within the predetermined range of the ID synchronizing window signal IDSW (or if the detected ID synchronizing signal IDS1 signal does not fall within the predetermined range of the ID synchronizing window signal IDSW). In the present case, the ID sync discriminating unit 116 selects and outputs the detected ID synchronizing signal IDS1 since the detected ID synchronizing signal IDS1 and the quasi ID synchronizing signal IDS2 fall within the predetermined range of the ID synchronizing window signal IDSW at times P1, P2, P4 and P5, and selects and outputs the quasi ID synchronizing signal IDS2 at time T3 since only the quasi ID synchronizing IDS2 signal falls within the predetermined range of the ID synchronizing window signal IDSW.

As described above, the quasi ID sync generator 112, the ID sync window generator 114, the ID sync discriminating unit 116 and the ID sync output unit 118 execute the operation of determining whether the detected ID synchronizing signal IDS1 is normal or not using the ID synchronizing window signal IDSW, and restoring the quasi ID synchronizing signal IDS2, which can be substituted for the abnormal detected ID synchronizing signal IDS1, as the ID synchronizing signal since it is impossible to accurately reproduce the information data when it is determined that the detected ID synchronizing signal IDS1 is abnormal.

Meanwhile, it is possible that the quasi ID synchronizing signal IDS2 will be output continuously as a restored ID synchronizing signal IDS4 even when it is determined that the detected ID synchronizing signal IDS1 is normal. In order to prevent the continuous output of the quasi ID synchronizing signal IDS2, the ID sync output unit 118 resets the ID window to thereby output the detected ID synchronizing signal as a restored ID synchronizing signal if the number of the detected ID synchronizing signal continuously existing without a predetermined range of the ID window is more than the number reset by the microcomputer. That is, the ID sync output unit 118 generates a reset signal RESET2 to reset the quasi ID sync generator 112. The reset quasi ID sync generator 112 generates the first quasi ID synchronizing signal IDS2 on the basis of the 26th restored ID synchronizing signal IDS4 synchronized with the detected ID synchronizing signal IDS1 and then generates a quasi ID synchronizing signal IDS2 every time 26 is counted.

A frame sync continuity checking unit 120 of FIG. 1 not described above inputs a synchronizing code detected by the sync detector 102 and discriminates the value of the inputted synchronizing code with the value shown in FIG. 3. As a result, the discriminated value thereof is designated one of the 4 state values shown therein. Thereafter, the frame sync continuity checking unit 120 recognizes SY0 as the ID synchronizing code when the value extracted upon discriminating two times more is arranged in an order of SY7→SY0→SY5. That is, the frame sync continuity checking unit 120 is for extracting more reliable ID synchronizing code through checking the synchronizing codes at the front and the rear of the ID synchronizing code. Here, when the detected sync data is arranged in an order of SY4→SY7→SY0→SY5→SY1→ . . . , the value of SY4→SY7→SY0 is designated "26". Furthermore, when the value of SY7→SY0→SY5 is designated "1" and the value of SY0→SY5→SY1 is designated "2" so that the value of the sync data of the frame sync continuity checking unit 120 is arranged in an order of 26→1→92, the frame sync continuity checking unit 120 outputs the value of SY0 designated "1" as the detected ID synchronizing code.

As described above, the present invention provides an apparatus which is capable of determining whether sync data is normal or not using a window signal and is further capable of substituting quasi sync data for the abnormal sync data when the sync data is abnormal in the DVD playback system, to enable normal reproduction of data despite damaged sync data in the DVD playback system.

While there have been illustrated and described what are considered to be preferred embodiments of the present invention, it will be understood by those skilled in the art that various changes and modifications and equivalents may be substituted for elements thereof without departing from the true scope and spirit of the present invention. Therefore, it is intended that the present invention not be limited to the particular embodiments disclosed, but that the present invention embrace all alternatives, modifications and variances falling within the scope of the appended claims.

What is claimed is:

1. A sync data restoring apparatus in a digital video disc (DVD) playback system, comprising:
   a sync detecting unit for detecting frame synchronizing code words and an identification (ID) synchronizing code word from predetermined eight-to-fourteen modulation (EFM) plus data, and for outputting corresponding detected frame synchronizing signals and a corresponding detected ID synchronizing signal;
   a quasi frame sync generating unit for generating a corresponding quasi frame synchronizing signal at a predetermined time in response to each of said detected frame synchronizing signals;
   a frame sync restoring unit for determining a first degree of approximation of each of said detected frame synchronizing signals with respect to said corresponding quasi frame synchronizing signal, for selecting for each of said detected frame synchronizing signals, one of each of said detected frame synchronizing signals and said corresponding quasi frame synchronizing signal according to the first degree of approximation result, thereby forming selected frame synchronizing signals, and for outputting said selected frame synchronizing signals as restored frame synchronizing signals;
   a quasi ID sync generating unit for receiving said detected ID synchronizing signal and for generating a corresponding quasi ID synchronizing signal at a predetermined time in response to one of said restored frame synchronizing signals; and
   an ID sync restoring unit for determining a second degree of approximation of said detected ID synchronizing signal with respect to said corresponding quasi ID synchronizing signal, for selecting one of said detected ID synchronizing signal and said corresponding quasi ID synchronizing signal according to the second degree of approximation result thereby forming a selected ID synchronizing signal, and for outputting said selected ID synchronizing signal as a restored ID synchronizing signal.

2. The sync data restoring apparatus according to claim 1, wherein said frame sync restoring unit is arranged to output one of said detected frame synchronizing signals as one of said restored frame synchronizing signals when said one of said detected frame synchronizing signals approximates said corresponding quasi frame synchronizing signal by a predetermined width, and to output said corresponding quasi frame synchronizing signal as one of said restored frame synchronizing signals when said one of said detected frame synchronizing signals does not approximate said corresponding quasi frame synchronizing signal by said predetermined width.

3. The sync data restoring apparatus according to claim 1, wherein said ID sync restoring unit is arranged to output said detected ID synchronizing signal as a restored ID synchronizing signal when said detected ID synchronizing signal approximates said corresponding quasi ID synchronizing signal by a predetermined width, and to output said corresponding quasi ID synchronizing signal as said restored ID synchronizing signal when said detected ID synchronizing signal does not approximate said corresponding quasi ID synchronizing signal by said predetermined width.

4. The sync data restoring apparatus according to claim 1, wherein said quasi frame sync generating unit is arranged to generate a first corresponding quasi frame synchronizing signal, corresponding to a first one of said detected frame synchronizing signals, in response to said first one of said detected frame synchronizing signals and to generate subsequent corresponding quasi frame synchronizing signals, corresponding respectively to subsequent ones of said detected frame synchronizing signals, every 1488 clock intervals.

5. The sync data restoring apparatus according to claim 4, wherein said quasi frame sync generating unit comprises a counter which counts said 1488 clock intervals wherein said quasi frame sync generating unit is arranged to generate said subsequent quasi frame synchronizing signals every time said counter counts said 1488 clock intervals.

6. The sync data restoring apparatus according to claim 4, wherein said frame sync restoring unit outputs a reset signal to said quasi frame sync generating unit, so that said quasi frame sync generating unit resumes operating in response to one of said detected frame synchronizing signals, when a predetermined number of said subsequent corresponding quasi frame synchronizing signals are restored continuously as said restored frame synchronizing signals.

7. The sync data restoring apparatus according to claim 5, wherein said frame sync restoring unit outputs a reset signal to said quasi frame sync generating unit, so that said quasi frame sync generating unit resumes operating in response to one of said detected frame synchronizing signals, when a predetermined number of said subsequent quasi frame synchronizing signals are restored continuously as said restored frame synchronizing signals.

8. The sync data restoring apparatus according to claim 1, wherein said quasi ID sync generating unit comprises a counter for counting every $26^{th}$ one of said restored frame synchronizing signals and for generating said corresponding quasi ID synchronizing signal every time said counter counts said $26^{th}$ one of said restored frame synchronizing signals, corresponding to a time required for restoring a second one of said detected frame synchronization signals after restoring a first one of said detected frame synchronizing signals.

9. The sync data restoring apparatus according to claim 8, wherein said ID sync restoring unit resets said quasi ID sync generating unit so that said quasi ID sync generating unit operates on a basis of one of said restored frame synchronizing signals if said corresponding quasi ID synchronizing signal is restored continuously as an ID synchronizing signal a predetermined number of times.

10. A sync data restoring apparatus in a digital video disc (DVD) playback system, comprising:
   a sync detecting unit for detecting frame synchronizing code words and an identification (ID) synchronizing code word from predetermined eight-to-fourteen modulation (EFM) plus data, and for outputting corresponding detected frame synchronizing signals and a corresponding detected ID synchronizing signal;
   a quasi frame sync generating unit for generating a corresponding quasi frame synchronizing signal in a predetermined time unit in response to each of said detected frame synchronizing signals;

a frame sync window generating unit for receiving each of said detected frame synchronizing signals and for generating a corresponding frame synchronizing window signal having a predetermined width in response to said corresponding quasi frame synchronizing signal;

a frame sync discriminating unit for determining whether each of said detected frame synchronizing signals and said corresponding quasi frame synchronizing signal fall within said predetermined width of said corresponding frame synchronizing window signal, and for outputting one of each of said detected frame synchronizing signals and said corresponding quasi frame synchronizing signal according to a first discrimination result;

a frame sync output unit for outputting ones of said detected frame synchronizing signals as restored frame synchronizing signals when ones of said detected frame synchronizing signals and said corresponding quasi frame synchronizing signal fall within said predetermined width of said corresponding frame synchronizing window signal, and for outputting said corresponding quasi frame synchronizing signal as said restored frame synchronizing signals when ones of said detected frame synchronizing signals and said corresponding quasi frame synchronizing signal do not fall within said predetermined width of said corresponding frame synchronizing window signal;

a quasi ID sync generating unit for generating a corresponding quasi ID synchronizing signal in response to said restored frame synchronizing signals at a predetermined time;

an ID sync window generating unit for receiving said detected ID synchronizing signal and for generating a corresponding ID synchronizing window signal having a predetermined width in response to said corresponding quasi ID synchronizing signal;

an ID sync discriminating unit for determining whether said detected ID synchronizing signal and said corresponding quasi ID synchronizing signal fall within said predetermined width of said corresponding ID synchronizing window signal, and for outputting one of said detected ID synchronizing signal and said corresponding quasi ID synchronizing signal according to a second discrimination result; and an ID sync output unit for outputting said detected ID synchronizing signal as a restored ID synchronizing signal when said detected ID synchronizing signal and said corresponding quasi ID synchronizing signal fall within said predetermined width of said corresponding ID synchronizing window signal, and for outputting said corresponding quasi ID synchronizing signal as said restored ID synchronizing signal when said detected ID synchronizing signal and said corresponding quasi ID synchronizing signal do not fall within said predetermined width of said corresponding ID synchronizing window signal.

11. The sync data restoring apparatus according to claim 10, wherein said quasi frame sync generating unit is arranged to generate an initial quasi frame synchronizing signal corresponding to an initial one of said detected frame synchronizing signals, in response to said initial one of said detected frame synchronizing signals and to generate subsequent quasi frame synchronizing signals, corresponding respectively to subsequent ones of said detected frame synchronizing signals, every 1488 clock intervals.

12. The sync data restoring apparatus according to claim 11, wherein said quasi frame sync generating unit comprises a counter for counting a time corresponding to said 1488 clock intervals.

13. The sync data restoring apparatus according to claim 11, wherein said frame sync output unit outputs a reset signal to said quasi frame sync generating unit, so that said quasi frame sync generating unit resumes operation in response to one of said detected frame synchronizing signals, when said subsequent quasi frame synchronizing signals are continuously output as said restored frame synchronizing signal for a predetermined amount of time.

14. The sync data restoring apparatus according to claim 12, wherein said frame sync output unit outputs a reset signal to said quasi frame sync generating unit, so that said quasi frame sync generating unit resumes operation in response to one of said detected frame synchronizing signals, when said subsequent quasi frame synchronizing signals are continuously output as said restored frame synchronizing signal for a predetermined amount of time.

15. The sync data restoring apparatus according to claim 10, wherein said quasi ID sync generating unit comprises a counter for counting every 26th one of said restored frame synchronizing signals.

16. The sync data restoring apparatus according to claim 15, wherein said ID sync output unit outputs a reset signal to said quasi ID sync generating unit so that said quasi ID sync generating unit resumes operation in response to one of said restored frame synchronizing signals when said corresponding quasi ID synchronizing signal is continuously output as said restored ID synchronizing signal a predetermined number of times.

17. A sync data restoring method in a digital video disc (DVD) playback system, comprising the steps of:

detecting frame synchronizing code words and an ID synchronizing code from predetermined eight-to-fourteen modulation (EFM) plus data;

outputting corresponding detected frame synchronizing signals and a corresponding detected ID synchronizing signal;

generating a corresponding quasi frame synchronizing signal in a predetermined time unit in response to each of said detected frame synchronizing signals;

restoring a frame sync by determining a first degree of approximation of each of said detected frame synchronizing signals to said corresponding quasi frame synchronizing signal;

selecting, for each of said detected frame synchronizing signals, one of each of said detected frame synchronizing signals and said corresponding quasi frame synchronizing signal according to the first decree of approximation result, thereby forming selected frame synchronizing signals;

outputting said selected frame synchronizing signals as restored frame synchronizing signals;

generating a corresponding quasi ID synchronizing signal in a predetermined time unit in response to one of said restored frame synchronizing signals;

restoring an ID sync by determining a second degree of approximation of said detected ID synchronizing signal to said corresponding quasi ID synchronizing signal;

selecting one of said detected ID synchronizing signal and said corresponding quasi ID synchronizing signal according to the second degree of approximation, thereby forming a selected ID synchronizing signal; and outputting said selected ID synchronizing signal as a restored ID synchronizing signal.

18. The sync data restoring method according to claim 17, wherein said step of restoring said frame sync comprises the steps of:
   outputting one of said detected frame synchronizing signals as one of said restored frame synchronizing signals when said one of said detected frame synchronizing signals approximates said corresponding quasi frame synchronizing signal by a predetermined width; and
   outputting said corresponding quasi frame synchronizing signal as one of said restored frame synchronizing signals when said one of said detected frame synchronizing signals does not approximate said corresponding quasi frame synchronizing signal by said predetermined width.

19. The sync data restoring method according to claim 17, wherein said step of restoring a ID sync comprises the steps of:
   outputting said detected ID synchronizing signal as said restored ID synchronizing signal when said detected ID synchronizing signal approximates said corresponding quasi ID synchronizing signal by a predetermined width; and
   outputting said corresponding quasi ID synchronizing signal as said restored ID synchronizing signal when said detected ID synchronizing signal does not approximate said corresponding quasi ID synchronizing signal by said predetermined width.

20. The sync data restoring method according to claim 17, wherein said step of generating said corresponding quasi frame synchronizing signal comprises the steps of generating a first corresponding quasi frame synchronizing signal, corresponding to a first one of said detected frame synchronizing signals, in response to said first one of said detected frame synchronizing signals; and
   generating subsequent corresponding quasi frame synchronizing signals, corresponding respectively to subsequent ones of said detected frame synchronizing signals, every 1488 T clock intervals.

21. The method according to claim 20, wherein said method further comprises the step of reinitiating generation of said corresponding quasi frame synchronizing signal in response to one of said detected frame synchronizing signals when said subsequent corresponding quasi frame synchronizing signals are restored continuously as said restored frame synchronizing signals a predetermined number of times.

22. The method according to claim 17, wherein said step of generating said corresponding quasi ID synchronizing signal comprises the step of generating a first corresponding quasi ID synchronizing signal in response to a $26^{th}$ one of said restored frame synchronizing signals; and
   generating an additional corresponding quasi ID synchronizing signal every time said counter counts 26 ones of said restored frame synchronizing signals, corresponding to a time required for restoring a second one of said detected frame synchronizing signals after restoring a first one of said detected frame synchronizing signals.

23. The method according to claim 22, further comprising the step of reinitiating generation of said corresponding quasi ID synchronizing signal in response to one of said restored frame synchronizing signals when said additional corresponding quasi ID synchronizing signal is restored continuously, as said restored ID synchronizing signal a predetermined number of times.

* * * * *